(12) United States Patent
Figiel

(10) Patent No.: US 9,540,769 B2
(45) Date of Patent: Jan. 10, 2017

(54) METHOD AND APPARATUS FOR MEASURING AND REMOVING ROTATIONAL VARIABILITY FROM A NIP PRESSURE PROFILE OF A COVERED ROLL OF A NIP PRESS

(71) Applicant: INTERNATIONAL PAPER COMPANY, Memphis, TN (US)

(72) Inventor: Kerry D. Figiel, Cincinnati, OH (US)

( * ) Notice: Subject to any disclaimer, the term of this patent is extended or adjusted under 35 U.S.C. 154(b) by 775 days.

(21) Appl. No.: 13/792,859

(22) Filed: Mar. 11, 2013

(65) Prior Publication Data

US 2014/0257719 A1    Sep. 11, 2014

(51) Int. Cl.
*D21F 3/06*    (2006.01)
*G01L 5/00*    (2006.01)

(52) U.S. Cl.
CPC ............... *D21F 3/06* (2013.01); *G01L 5/0085* (2013.01)

(58) Field of Classification Search
CPC .................................. D21F 3/06; G01L 5/0085
USPC .......................................................... 702/41
See application file for complete search history.

(56) References Cited

U.S. PATENT DOCUMENTS

| | | |
|---|---|---|
| 757,221 A | 4/1904 | Partridge |
| 2,300,909 A | 11/1942 | Broughton |
| 3,622,448 A | 11/1971 | Adams et al. |
| 3,673,865 A | 7/1972 | Michaelsen |
| 3,794,427 A | 2/1974 | Shibata et al. |
| 3,840,302 A | 10/1974 | Brunton et al. |
| 3,863,453 A | 2/1975 | Mercier |
| 3,936,665 A | 2/1976 | Donoghue |
| 3,989,085 A | 11/1976 | Crosby |
| 4,019,066 A | 4/1977 | Lucas et al. |
| 4,059,794 A | 11/1977 | Furness et al. |

(Continued)

FOREIGN PATENT DOCUMENTS

| | | |
|---|---|---|
| EP | 1653207 | 5/2006 |
| EP | 2641857 | 12/2015 |

(Continued)

OTHER PUBLICATIONS

Sasaki et al., In-Roll Stress Analysis Considering Air-Entrainment at the Roll-Inlet with the Effect of Grooves on Nip Roll Surface, 2008, pp. 133-145, vol. 2, No. 1, Journal of Advanced Mechanical Design, Systems, and Manufacturing.

*Primary Examiner* — Hyun Park
*Assistant Examiner* — Eyob Hagos
(74) *Attorney, Agent, or Firm* — Thomas W. Barnes, III

(57) ABSTRACT

Multiple groups of sensors are circumferentially spaced apart at each cross-directional position along a sensing roll of a nip press to measure and cancel or nearly cancel the effects of rotational variability which may be acting on the sensing roll. The strategically-placed sensors are designed to measure the pressure being placed against the web that is being advanced through the nip press. The average of the measurements of multiple sensors spaced circumferential apart provides a good cancellation of any rotational variability that might be found at a cross-directional position on the sensing roll. In this manner, a more true measurement of the nip pressure profile can be obtained and better adjustments made to reduce nip pressure profile variability. In addition, the nip variability profile may be used as a predictor of cover or bearing failures, resonant frequencies and other roll anomalies.

25 Claims, 9 Drawing Sheets

(56) References Cited

U.S. PATENT DOCUMENTS

| | | |
|---|---|---|
| 4,092,068 A | 5/1978 | Lucas et al. |
| 4,152,202 A | 5/1979 | DeLigt |
| 4,233,011 A | 11/1980 | Bolender et al. |
| 4,423,636 A | 1/1984 | Plante |
| 4,495,587 A | 1/1985 | Plante et al. |
| 4,509,237 A | 4/1985 | Volz et al. |
| 4,524,546 A | 6/1985 | Hoover et al. |
| 4,729,153 A | 3/1988 | Pav et al. |
| 4,879,471 A | 11/1989 | Dahlquist |
| 4,898,012 A * | 2/1990 | Jones .................. B21B 27/05 492/10 |
| 4,903,528 A | 2/1990 | Balakrishnan et al. |
| 4,921,574 A | 5/1990 | Hu |
| 4,947,684 A | 8/1990 | Balakrishnan |
| 5,022,966 A | 6/1991 | Hu |
| 5,048,353 A | 9/1991 | Justus |
| 5,121,332 A | 6/1992 | Balakrishnan et al. |
| 5,122,963 A | 6/1992 | Chen |
| 5,125,746 A | 6/1992 | Lipshitz |
| 5,358,606 A | 10/1994 | Makkonen |
| 5,379,652 A | 1/1995 | Allonen |
| 5,383,371 A | 1/1995 | Laitinen |
| 5,400,258 A | 3/1995 | He |
| 5,562,027 A * | 10/1996 | Moore .................. D21F 3/06 100/176 |
| 5,563,809 A | 10/1996 | Williams et al. |
| 5,699,729 A | 12/1997 | Moschel |
| 5,725,737 A | 3/1998 | Pikulik et al. |
| 5,743,177 A | 4/1998 | Wostbrock |
| 5,745,365 A | 4/1998 | Parker |
| 5,960,374 A | 9/1999 | Lausier |
| 6,152,720 A | 11/2000 | Greb et al. |
| 6,336,078 B1 | 1/2002 | Sakayori et al. |
| 6,356,846 B1 | 3/2002 | Habeger, Jr. et al. |
| 6,411,860 B1 | 6/2002 | Chen |
| 6,482,339 B1 | 11/2002 | Greb et al. |
| 6,519,552 B1 | 2/2003 | Sampath et al. |
| 6,567,720 B1 | 5/2003 | Figiel |
| 6,568,285 B1 * | 5/2003 | Moore .................. G01L 5/0085 73/159 |
| 6,769,314 B2 | 8/2004 | Moore |
| 6,805,899 B2 | 10/2004 | MacHattie et al. |
| 6,849,851 B2 | 2/2005 | Komulainen et al. |
| 6,925,279 B2 | 8/2005 | Kamoshita |
| 6,934,028 B2 | 8/2005 | Ho et al. |
| 6,950,777 B1 | 9/2005 | Lilburn et al. |
| 7,018,708 B2 | 3/2006 | Song et al. |
| 7,127,315 B2 | 10/2006 | Junge et al. |
| 7,155,356 B2 | 12/2006 | Mantyla et al. |
| 7,185,537 B2 | 3/2007 | Muhs |
| 7,225,688 B2 | 6/2007 | Moore et al. |
| 7,261,680 B2 | 8/2007 | Lutz |
| 7,294,234 B2 | 11/2007 | Munch et al. |
| 7,305,894 B2 | 12/2007 | Moore et al. |
| 7,392,715 B2 | 7/2008 | Moore et al. |
| 7,406,876 B2 | 8/2008 | Krozer |
| 7,444,862 B2 | 11/2008 | Innala et al. |
| 7,581,456 B2 | 9/2009 | Moore et al. |
| 7,582,188 B2 | 9/2009 | Stoffel et al. |
| 7,608,166 B2 | 10/2009 | Huang et al. |
| 7,608,338 B2 | 10/2009 | Song et al. |
| 7,629,799 B2 | 12/2009 | Murphy |
| 7,736,466 B2 | 6/2010 | Singh et al. |
| 7,745,525 B2 | 6/2010 | Koenig |
| 7,815,770 B2 | 10/2010 | Huang et al. |
| 7,828,935 B2 | 11/2010 | Huang et al. |
| 7,963,180 B2 | 6/2011 | Moore et al. |
| 7,967,953 B2 | 6/2011 | Singh et al. |
| 8,007,920 B2 | 8/2011 | Song et al. |
| 8,012,551 B2 | 9/2011 | Song et al. |
| 8,123,907 B2 | 2/2012 | Stoffel et al. |
| 8,236,141 B2 | 8/2012 | Pak |
| 8,292,295 B2 | 10/2012 | Ohshima et al. |
| 8,361,573 B2 | 1/2013 | Koenig |
| 8,372,243 B2 | 2/2013 | Singh et al. |
| 8,382,946 B2 | 2/2013 | Song et al. |
| 8,440,053 B2 | 5/2013 | Koenig et al. |
| 8,474,333 B2 | 7/2013 | Berendes |
| 8,475,347 B2 | 7/2013 | Gustafsom et al. |
| 8,540,241 B2 | 9/2013 | Sugahara |
| 8,574,690 B2 | 11/2013 | Koenig et al. |
| 8,586,156 B2 | 11/2013 | Koenig et al. |
| 8,586,279 B2 | 11/2013 | Williams et al. |
| 8,586,280 B2 | 11/2013 | Williams et al. |
| 8,608,908 B2 | 12/2013 | Koenig et al. |
| 8,652,593 B2 | 2/2014 | Koenig |
| 8,652,594 B2 | 2/2014 | Koenig et al. |
| 8,697,203 B2 | 4/2014 | Koenig |
| 8,758,565 B2 | 6/2014 | Singh et al. |
| 8,758,886 B2 | 6/2014 | Koenig et al. |
| 8,795,796 B2 | 8/2014 | Koenig |
| 9,121,686 B2 | 9/2015 | Gustafson |
| 2004/0237665 A1 | 12/2004 | Mucke et al. |
| 2005/0208878 A1 | 9/2005 | Weiss |
| 2006/0248723 A1 | 11/2006 | Gustafson |
| 2007/0006644 A1 | 1/2007 | Schultheis |
| 2008/0087073 A1 | 4/2008 | Ulfert et al. |
| 2009/0320612 A1 * | 12/2009 | Moore .................. G01L 5/0085 73/862.55 |
| 2010/0125428 A1 | 5/2010 | Moore |
| 2011/0107660 A1 | 9/2011 | Syrjanen et al. |
| 2012/0310596 A1 | 12/2012 | Gustafson et al. |
| 2013/0185015 A1 | 7/2013 | Cantrell |
| 2014/0352882 A1 | 12/2014 | Nash et al. |
| 2015/0316429 A1 | 11/2015 | Figiel |
| 2015/0316430 A1 | 11/2015 | Figiel |
| 2015/0316432 A1 | 11/2015 | Figiel |
| 2016/0038969 A1 | 2/2016 | Schmitt |

FOREIGN PATENT DOCUMENTS

| | | |
|---|---|---|
| WO | 9625288 | 8/1996 |
| WO | 2005113891 | 12/2005 |
| WO | WO-2008/155461 | 12/2008 |
| WO | WO-2009/092761 | 7/2009 |

* cited by examiner

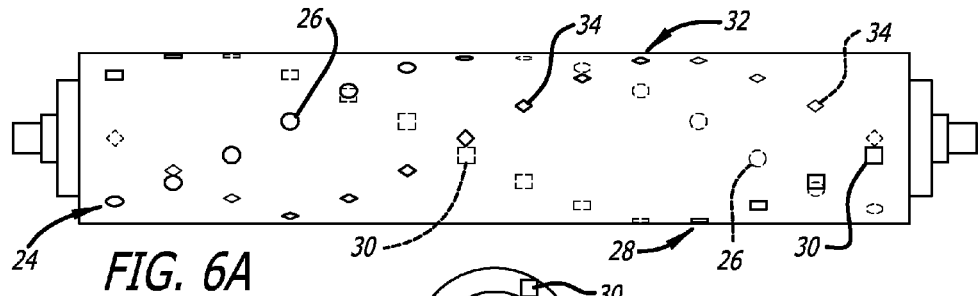
FIG. 6A
FIG. 6B
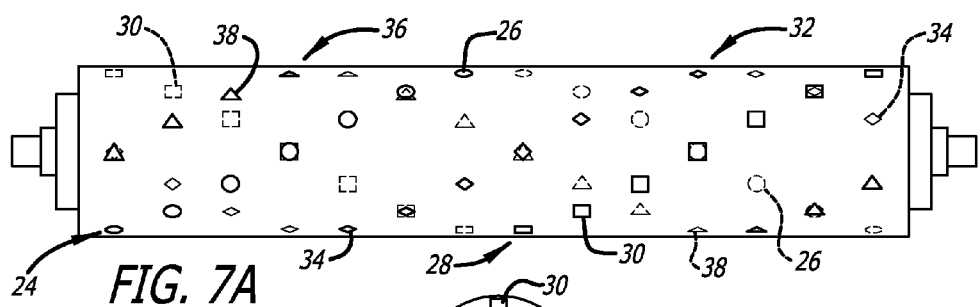
FIG. 7A
FIG. 7B
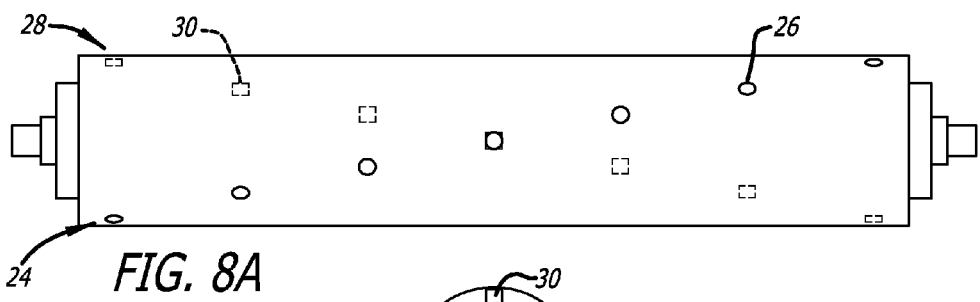
FIG. 8A
FIG. 8B

METHOD AND APPARATUS FOR MEASURING AND REMOVING ROTATIONAL VARIABILITY FROM A NIP PRESSURE PROFILE OF A COVERED ROLL OF A NIP PRESS

BACKGROUND OF THE INVENTION

The present invention relates generally to nip presses used to exert pressing forces on moving webs for the formation of, for example, paper, textile material, plastic foil and other related materials. In particular, the present invention is directed to methods and apparatus for measuring and removing the effects of rotational variability from the nip pressure profile of nip presses which utilize imbedded sensors in covered rolls. While prior art presses which utilize rolls with imbedded sensors may be capable of detecting variations in pressure along the length of the roll, these same imbedded sensors may not be capable of measuring and compensating for rotational variability that can be generated by the high speed rotation of the covered roll. The present invention provides a method and apparatus for measuring and removing rotational variability from the nip pressure profile of the covered roll so as to obtain a more true profile of the nip pressure being developed in the nip region.

Nipped rolls are used in a vast number of continuous process industries including, for example, papermaking, steel making, plastics calendering and printing. The characteristics of nipped rolls are particularly important in papermaking. In the process of papermaking, many stages are required to transform headbox stock into paper. The initial stage is the deposition of the headbox stock, commonly referred to as "white water," onto a paper machine forming fabric, commonly referred to as a "wire." Upon deposition, the a portion of the white water flows through the interstices of the forming fabric wire leaving a mixture of liquid and fiber thereon. This mixture, referred to in the industry as a "web," can be treated by equipment which further reduce the amount of moisture content of the finished product. The fabric wire continuously supports the fibrous web and advances it through the various dewatering equipment that effectively removes the desired amount of liquid from the web.

One of the stages of dewatering is effected by passing the web through a pair or more of rotating rolls which form a nip press or series thereof, during which liquid is expelled from the web via the pressure being applied by the rotating rolls. The rolls, in exerting force on the web and fabric wire, will cause some liquid to be pressed from the fibrous web. The web can then be advanced to other presses or dry equipment which further reduce the amount of moisture in the web. The "nip region" is the contact region between two adjacent rolls through which the paper web passes. One roll of the nip press is typically a hard steel roll while the other is constructed from a metallic shell covered by a polymeric cover. However, in some applications both roll may be covered. The amount of liquid to be pressed out of the web is dependent on the amount of pressure being placed on the web as it passes through the nip region. Later rolls in the process at the machine calender are used to control the caliper and other characteristics of the sheet. Covered rolls are at times used at the calender. The characteristics of the rolls are particularly important in papermaking as the amount of pressure applied to the web during the nip press stage can be critical in achieving uniform sheet characteristics.

One common problem associated with such rolls can be the lack of uniformity in the pressure being distributed along the working length of the roll. The pressure that is exerted by the rolls of the nip press is often referred to as the "nip pressure." The amount of nip pressure applied to the web and the size of the nip can be important in achieving uniform sheet characteristics. Even nip pressure along the roll is important in papermaking and contributes to moisture content, caliper, sheet strength and surface appearance. For example, a lack of uniformity in the nip pressure can often result in paper of poor quality. Excessive nip pressure can cause crushing or displacement of fibers as well as holes in the resulting paper product. Improvements to nip loading can lead to higher productivity through higher machine speeds and lower breakdowns (unplanned downtime).

Conventional rolls for use in a press section may be formed of one or more layers of material. Roll deflection, commonly due to sag or nip loading, can be a source of uneven pressure and/or nip width distribution. Worn roll covers may also introduce pressure variations. Rolls have been developed which monitor and compensate for these deflections. These rolls generally have a floating shell which surrounds a stationary core. Underneath the floating shell are movable surfaces which can be actuated to compensate for uneven nip pressure distribution.

Previously known techniques for determining the presence of such discrepancies in the nip pressure required the operator to stop the roll and place a long piece of carbon paper or pressure sensitive film in the nip. This procedure is known as taking a "nip impression." Later techniques for nip impressions involve using mylar with sensing elements to electronically record the pressures across the nip. These procedures, although useful, cannot be used while the nip press is in operation. Moreover, temperature, roll speed and other related changes which would affect the uniformity of nip pressure cannot be taken into account.

Accordingly, nip presses were developed over the years to permit the operator to measure the nip pressure while the rolls were being rotated. One such nip press is described in U.S. Pat. No. 4,509,237. This nip press utilizes a roll that has position sensors to determine an uneven disposition of the roll shell. The signals from the sensors activate support or pressure elements underneath the roll shell, to equalize any uneven positioning that may exist due to pressure variations. The pressure elements comprise conventional hydrostatic support bearings which are supplied by a pressurized oil infeed line. The roll described in U.S. Pat. No. 4,898,012 similarly attempts to address this problem by incorporating sensors on the roll to determine the nip pressure profile of a press nip. Yet another nip press is disclosed in U.S. Pat. No. 4,729,153. This controlled deflection roll further has sensors for regulating roll surface temperature in a narrow band across the roll face. Other controlled deflection rolls such as the one described in U.S. Pat. No. 4,233,011, rely on the thermal expansion properties of the roll material, to achieve proper roll flexure.

Further advancements in nip press technology included the development of wireless sensors which are imbedded in the sensing roll covers of nip presses as is disclosed in U.S. Pat. Nos. 7,225,688; 7,305,894; 7,392,715; 7,581,456 and 7,963,180 to Moore et al. These patents show the use of numerous sensors imbedded in the roll cover, commonly referred to as a "sensing roll," which send wireless pressure signals to a remote signal receiver. U.S. Pat. No. 5,699,729 to Moschel discloses the use of a helical sensor for sensing pressure exhibited on a roll. Paper machine equipment manufacturers and suppliers such as Voith GmbH, Xerium Technologies, Inc. and its subsidiary Stowe have developed nip presses which utilize sensors imbedded within the sensing roll cover. These nip press generally utilize a plurality of sensors connected in a single spiral wound around the roll cover in a single revolution to form a helical pattern. An individual sensor is designed to extend into the nip region of the nip press as the sensing roll rotates. In this fashion, the helical pattern of sensors provides a different pressure signal along the cross-directional region of the nip press to provide the operator with valuable information regarding the pressure distribution across the nip region, and hence, the pressure that is being applied to the moving web as it passes through the nip region.

Control instrumentation associated with the nip press can provide a good representation of the cross-directional nip pressure (commonly referred to as the "nip pressure profile" or just "nip profile") and will allow the operator to correct the nip pressure distribution should it arise. The control instruments usually provide a real time graphical display of the nip pressure profile on a computer screen or monitor. The nip profile is a compilation of pressure data that is being received from the sensors located on the sensing roll. It usually graphically shows the pressure signal in terms of the cross-directional position on the sensing roll. The y-axis usually designates pressure in pounds per linear inch while the x-axis designates the cross-directional position on the roll.

While a single line of sensors on the sensing roll may provide a fairly good representation of nip pressure cross-directional variability, these same sensors may not properly take into account the variability of pressure across the nip region caused by the high speed rotation of the sensing roll. The dynamics of a cylinder/roll rotating at a high angular speed (high RPMs) can cause slight changes to the pressure produced by the cylinder/roll that are not necessarily detectable when the cylinder/roll is at rest or rotating at a low speed. Such dynamic changes could be the result of centrifugal forces acting on the cylinder/roll, roll flexing, roll balance, eccentric shaft mounting or out-or round rolls and could possibly be influenced by environmental factors. The dynamic behavior of a typical high speed rotating cylinder/roll is often characterized by a development of an unbalance and bending stiffness variation. Such variations along the cylinder/roll are often referred to as rotational variability. Unbalance can be observed as a vibration component at certain rotating frequencies and also can cause unwanted bending of the flexible cylinder/roll as a function of the rotating speed. Since the lengths of the sensing rolls used in paper manufacturing can be quite long, unbalance in the rotating rolls can pose a serious problem to the paper manufacturer since a less than even nip pressure profile may be created and displayed by the control equipment. Any unwanted bending of the sensing roll can, of course, change the amount of pressure being exerted on the web as it travels through the nip roller. Again, since even nip pressure is highly desired during paper manufacturing, it would be highly beneficial to correctly display the nip pressure profile since any corrects to be made to the rotating roll based on an inaccurate nip pressure profile could certainly exacerbate the problem. A single sensor located at an individual cross-directional position on the sensing roll may not be able to compensate for the effect of rotational variability at that sensor's position and may provide less than accurate pressure readings. There are three primary measurements of variability. The true nip pressure profile has variability that can be term cross-directional variability as it is the variability of average pressure per cross-direction position across the nip. Each sensor in a single line of sensors may have some variability associated with it that may be calculated as the data is collected at high speed. This particular variability profile represents the variability of the high speed measurements at each position in the single line of sensors. This variability contains the variability of other equipment in the paper making process including the rotational variability of the roll nipped to the sensing roll. The third variability profile is the nip profile variability of multiple sensors at each cross-directional position of the roll. This variability represents the "rotational variability" of the sensing roll as it rotates through its plurality or sensing positions.

One of the problems of rotational variability is the creation of "high spots" and "low stops" at various locations along the sensing roll. A single sensor located at a cross-directional position where a high spot or low spot is found could provide the processing equipment with an inaccurate pressure reading being developed at that location. This is due to the fact that the overall pressure that is developed at the sensor's location as the roll fully rotates through a complete revolution will be lower that the measured "high spot" reading. Accordingly, a nip pressure profile which is based on the reading of a sensor located at a high or low spot will not be indicative of the average pressure being developed that that location. The processing equipment, in relying on this single, inaccurate reading, will calculate and display a nip pressure profile which is at least partially inaccurate. If a number of single sensors are located at numerous high or low spots, then the processing equipment will display a nip pressure profile which has numerous inaccuracies. The operator of the papermaking machinery may not even be aware that the processing system is displaying an inaccurate nip pressure profile. Further, attempts to correct the sensing roll based on an inaccurate nip pressure profile could lead to even greater inaccuracies.

Therefore, it would be beneficial if the manufacturer could detect and measure any rotational variability along the length of the covered roll of a nip press and compensate for it when a real time nip pressure profile is being calculated and displayed. The present invention provides a better measurement of the true nip pressure profile and is also capable of providing a previously unmeasured nip profile variability of the rotation (rotational variability). Furthermore, certain arrangements of sensing elements will provide information on the wear of the cover. Compensation for any rotational variability should produce a nip pressure profile which is a more accurate representation of the pressure being developed along the nip region of the press. The present inventions satisfy these and other needs.

SUMMARY OF THE INVENTION

The present invention provides apparatus and methods for accurately detecting, measuring and at least partially removing any effects of rotational variability from a covered roll (also referred to as a "sensing roll") used in nip presses. The present invention compensates for this effect allowing a more accurate display of the nip pressure profile to be calculated and displayed. The present invention thus provides the machine operator with a more accurate representation of the actual pressure distribution across the nip press. The present invention could be used in collaboration with correcting instrumentation which can eliminate or compensate for pressure variability at locations across the sensing roll of the press. The data obtained from the arrangement of sensors along the sensing roll allows for the calculation and display of a rotational variability profile which can provide the operator with additional real time information concerning the dynamics of the pressure readings in order to obtain a more accurate nip pressure profile. The present invention can compensate for rotational variability in the sensing mechanism by calculating, for example, an average pressure value at each cross-directional ("CD") position along the sensing roll. The present invention also could calculate and obtain a more accurate nip pressure profile utilizing other models, such as curve fitting.

The present invention uses multiple sensors circumferentially spaced at various cross-directional positions along the sensing roll in order to cancel the effects of rotational variability which may, or may not, be acting on the sensing roll. These strategically-placed sensors are designed to measure the pressure being placed against the web that is being advanced through the nip press. Previous work has demonstrated that roll rotational variability principally occurs at 1 times the rotational frequency of the roll and occasionally at 2 times the rotational frequency, primarily near the edges of the roll. Higher frequencies are rarely seen and then normally only at the extreme edges of the roll. In additional, cycles at each cross-directional position may be in phase where the highs and lows occur simultaneously across the entire roll width (known as "barring") or the phasing of the highs and lows may vary across the roll as it rotates. Analysis of these variability patterns has demonstrated that the average of measurements of two sensors spaced 180° circumferential apart at a cross-directional position of a covered roll should provide a good measurement of the actual pressure being developed and would cancel, or at least partially cancel, any rotational variability of 1 times the rotational frequency that might develop at this position. Similarly the average of measurements of three sensors spaced 120° or four sensors spaced 90° circumferential apart at a cross-directional position of a covered roll should provide a good measurement of the actual pressure being developed and would cancel, or at least partially cancel, any rotational variability of 2 times the rotational frequency that might develop at this position. Alternate positioning of multiple sensors to remove the effect of rotation is possible. In this manner, a more true measurement of the pressure distribution across the nip region should be obtainable. Information on higher frequency barring which is indicative of cover wear and has been seen at calender stacks may be obtained by spacing the sensing elements at different rotational positions. The difference between individual sensing elements and the average of the group of sensing elements at the same cross-direction progression provides a measure of the roundness of the roll and shape of the cover. The progression of this difference as the cover ages is an indicator of cover wear.

The present invention provides advantages over sensing rolls and system which utilize a single sensor assigned to measure the pressure at a particular cross-directional position. Sensing rolls which just utilize a single sensor disposed at a cross-directional position on a roll lack the ability to take secondary measurements at the same cross-directional position for purposes of comparison to determine if there is any unbalance at that particular cross-directional position. As a result, such a sensing roll may provide inaccurate readings for calculating and displaying the nip profile. If the single sensor is placed at a position where there is a high or low spot, caused by rotational imbalance, then that sensor's pressure reading will not be quite accurate and its reading would lead to the calculation of an inaccurate nip pressure profile. Additionally, the use of single sensors at each CD position cannot generate the necessary data to allow for the calculation and display of a rotational variability profile which could provide the operator with additional real time information in order to obtain a more accurate nip pressure profile. The present invention allows for the calculation and display of such a rotational variability profile, along with the nip pressure profile.

In one aspect, the sensing roll for use in a nip press includes strategically-placed sensors including a first set of sensors disposed in a particular configuration along a roll cover that overlies a cylindrical member. Each sensor of this first set is located at a particular lateral position (cross-directional position) on the roll cover. The sensing roll further includes additional sets of sensors which are likewise disposed in a particular configuration on the roll cover, each sensor of the second set being likewise disposed at a particular cross-directional position. Each sensor of the first set of sensors has a corresponding sensor in the additional sets to define the CD group of sensors that are utilized to take the pressure readings at a particular cross-directional position. Again, each sensor at the cross-directional position is spaced circumferentially apart from the other. Multiple corresponding sensors can be strategically placed at different cross-directional positions along the length of the sensing roll, each pair of sensors designed to measure the pressure being developed at that cross-directional position. Each sensor will measure the pressure as it enters the nip region of the press. In theory, each corresponding sensors of a CD group should measure the same pressure at the particular cross-directional position if the sensing roll is truly balanced. If the pressure measurements for the two corresponding sensors are significantly different, then the measurements would indicate some variability that may be caused by the dynamics of the rotating sensing roll. The present invention allows the sensing roll to take multiple, not just one, pressure measurements at each cross-directional position during each 360° revolution of the sensing roll. These multiple measurements are utilized to obtain a more accurate nip pressure profile and a rotational variability profile. In one aspect of the invention, the readings at each sensor can be averaged to determine an average pressure measurement at that particular cross-directional position. This averaged measurement can then be used in computing and displaying the nip pressure profile. The same readings can be used to calculate and display the rotational variability profile of the operating nip press. The variability of the readings at each position will be monitored and displayed to determine if the roll rotational variability is stable or increasing. There are many possible measures of this variability including variance, standard deviation, 2 sigma, percent of process, co-variance, peak to peak. Increasing variability using any measure may be indicative of a potential failure in the bearings or roll cover or other roll problems.

In another aspect, multiple sets of sensors are disposed so as a particular pattern of lined-up sensors are created. For example, the pattern could be a continuous helical configuration which extends around the sensing roll in one revolution forming a helix around the sensing roll. The sensors of several sets can be aligned in a number of different patterns along the length of the sensing roll in order to develop a good representative nip pressure profile. In another aspect, the continuous line of sensors can extend only partially around the sensing roll, for example, in one half (½) revolution. A second set of sensors would also extend around the sensing roll in one half (½) revolution. In this manner, only a partial helix is formed around the sensing roll 10. This arrangement of sensors still allows a pair of sensors to be assigned to a particular CD position. These sets of sensors would be spaced 180° circumferential apart from each other. In a similar manner three helixes may be wound 120° each, four 90° each or n helixes 360°/n each. The particular advantage of this arrangement of sensors is in sensing short wavelength bars that may be associated with cover wear as each sensing element is at a different rotational position.

In another aspect, a system for calculating and displaying a nip pressure profile and rotational variability profile for a nip press includes a sensing roll configured with a second roll in a nip arrangement, the sensing roll and the second roll adapted to rotatingly press matter therebetween in a nip region. The sensing roll has a plurality of cross-directional positions defined along its length. The sensing roll including a first set of pressure-measuring sensors and additional sets of pressure-measuring sensors, each sensor of the plural sets of sensors being disposed at a particular cross-directional position along the sensing roll. Each sensor is configured to sense and measure pressure when the sensor enters the nip region of the nip press. Again, each sensor of the first set has corresponding sensors in the additional sets which are located at the same cross-directional position but are spaced apart circumferentially on the sensing roll to provide multiple pressure readings at each cross-directional position. The plurality of readings can be used to calculate and formulate the nip pressure profile and rotational variability profile for the press. In one aspect, an average pressure reading at each location can be calculated to obtain a more accurate nip pressure profile.

A transceiver can be attached to the sensing roll and to each of the sensors of the multiple sets for transmitting data signals from the sensors to a receiver unit. A processing unit for calculating the nip pressure distribution based on the pressure measurements of each CD group of corresponding sensors of the first and additional sets of sensors can be coupled to the sensing roll. A display unit also could be coupled to the processing unit to provide a visual display of the nip pressure profile and the rotational variability profile.

A method for sensing and removing the effects of rotational variability from the nip pressure profile of a sensing roll of a nip press includes providing a sensing roll having a working length and a number of cross-directional positions disposed along the working length. Multiple pressure-measuring sensors are placed at each of the cross-directional positions, the sensors of each cross-directional position being spaced apart circumferentially from each other. The pressure being exerted on each sensor of each CD group as the sensor moves into the nip region of the nip press is then measured with the pressure measurements of each sensor at that cross-directional position being calculate to obtain an average pressure measurement at the respective cross-directional position. The obtained pressure measurements calculated at each cross-directional position can then be utilized to create a nip pressure profile for the nip press.

In yet another aspect, a method for measuring and removing the effects of rotational variability from the nip pressure profile of a sensing roll of a nip press includes measuring the pressure exerted on a first sensor disposed at a particular cross-directional position on the sensing roll of the nip press as the first sensor enters the nip region of the press. The pressure exerted on additional sensors is also measured as the second sensor enters the nip region of the press. The additional sensors are located at the same cross-directional position as the first sensor but spaced apart circumferentially from the first sensor. The pressure measurements of the multiple sensors are used to calculate and display the nip pressure profile and rotational variability profile. Multiple pluralities of sensors could be placed at various cross-directional positions along the sensing roll in order to measure pressures at multiple offset locations for each cross-directional position. The pressure measurements from the multiple sensors for each cross-directional position are averaged and used to calculate and display the nip pressure profile that is developed across the nip region. The method may include providing corrective procedures to the sensing roll in order to adjust for high or low pressure spots along the nip pressure profile.

These and other advantages of the present invention will become apparent from the following detailed description of preferred embodiments which, taken in conjunction with the drawings, illustrate by way of example the principles of the invention.

BRIEF DESCRIPTION OF THE DRAWINGS

FIG. 6A is a side view of a particular embodiment of a sensing roll made in accordance with the present invention which shows the placement of three sets of sensors along the length of the roll.

FIG. 6B is an end view of the sensing roll of FIG. 6A showing the placement of the first, second and third sets of sensors some 120° apart circumferentially on the sensing roll.

FIG. 7A is a side view of a particular embodiment of a sensing roll made in accordance with the present invention which shows the placement of four sets of sensors along the length of the roll.

FIG. 7B is an end view of the sensing roll of FIG. 7A showing the placement of the first, second, third and fourth sets of sensors some 90° apart circumferentially on the sensing roll.

FIG. 8A is a side view of a particular embodiment of a sensing roll made in accordance with the present invention which shows the placement of two sets of sensors wound 180° circumferentially along the length of the roll.

FIG. 8B is an end view of the sensing roll of FIG. 8A showing the placement of the first and second sets of sensors some 180° apart circumferentially on the sensing roll.

DETAILED DESCRIPTION OF THE PREFERRED EMBODIMENTS

The present invention relates to rolls for use particularly in nipped roll presses, in which rolls exert pressing forces on webs for forming paper, textile material, plastic foil and other related materials. Although the present invention may be used in the above industries, the discussion to follow will focus on the function of rolls for use particularly in the manufacture of paper and particularly to a nip press for dewatering a fibrous web, comprising a sensing roll disposed so as to rotatingly cooperate with another roll in the nip press. FIGS. 1-5 depict the embodiment wherein two sensors are positioned 180° circumferentially across the width of the roll at each cross-directional location as this provides the simplest illustration. Additional embodiments with multiple sensors at each CD location can be extrapolated, as is shown in FIGS. 6-8B.

Figure 1:
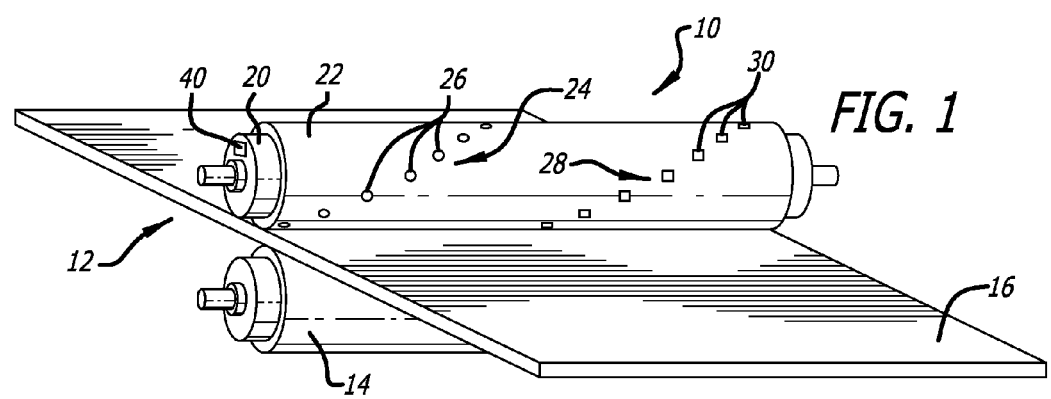
FIG. 1 is a perspective view showing a nip press which utilizes a particular embodiment of a sensing or covered roll made in accordance with the present invention.
Figure 2:
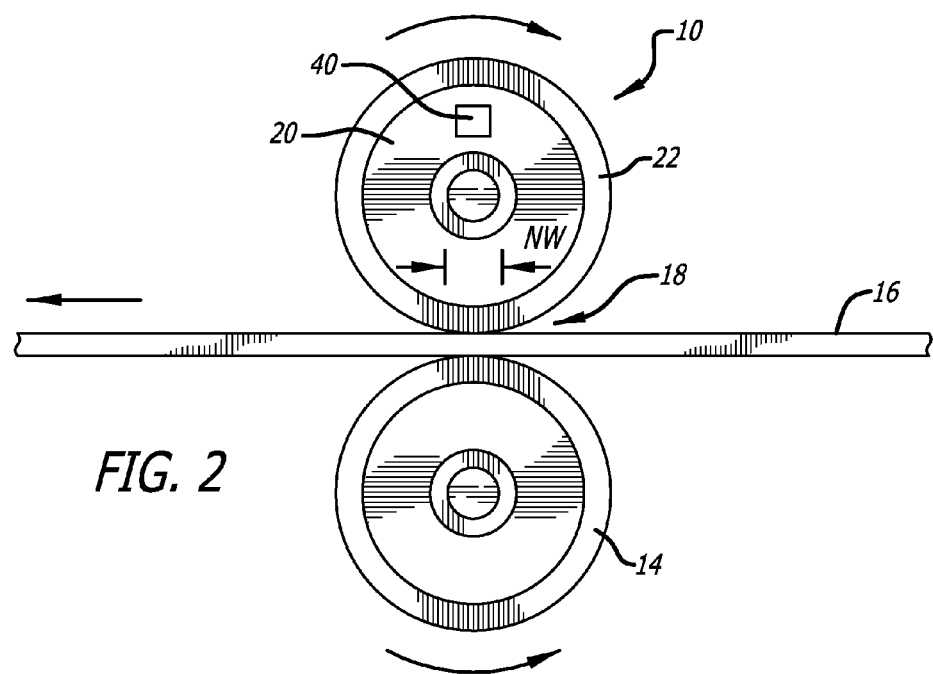
FIG. 2 is an end, schematic view of the nip press of FIG. 1 showing the formation of a web nipped between the nip rolls, the nip width of the nip press being designated by the letters "NW."

As shown in FIG. 1, a schematic perspective view shows a sensing roll 10 made in accordance with the present invention as a portion of a nip press 12 which includes a second roll 14 that cooperates with the sensing roll 10 to produce pressure on a fibrous web 16 that is advanced between the two rolls 10, 14. The sensing roll 10 and second roll 14 rotate, as is indicated by arrows in FIG. 2, and are spaced apart at a nip region 18 where the two rolls 10, 14 somewhat meet in order to place pressure on the fibrous web 16 so as to remove some of the liquid suspended in the web 16. The letters NW in FIG. 2 indicate the formed "nip width" of the nip region 18. This nip region 18 extends along the entire cross-directional length of the sensing roll 10 and second roll 14. The sensing roll 10 may include an inner base roll 20 and the outer roll cover 22 may comprise materials suitable for use in making a press roll. The inner base roll 20 may include one or more lower layers, with the outer roll cover 22 being the top layer. This composite sensing roll 10 with the roll cover 24 is commonly known as a "covered roll" in the industry. The second roll 14 may be an uncovered roll or also comprise of a number of layers of materials and a base roll as well. If multiple covered rolls are contained in the nip, each may have sensors and produce nip profiles and variability profiles. The nip profiles or the two covered rolls may be averaged together for greater accuracy in making nip profile adjustments. However, the variability profiles of each covered roll provide information about the condition of that specific roll. It should be appreciated that while the present embodiments focuses only in a single nip, it is possible to utilize single rolls involved in bi-nip, tri-nip or multi-nip interactions which are common in the paper industry. One two rolls 10, 14 are depicted to more clearly describe the advantages associated with the present invention. However, multiple nip profiles can be generated with each independent sensing roll utilizes in the nip press.

Referring now to FIGS. 1 and 3, a first set 24 of sensors 26 is associated with the sensing roll 10 along with a second set 28 of sensors 30. Sensors 26 of the first set 24 are designated by a circle while sensors 30 of the second set 28 are designated by a square. Circles and squares have been used for ease in identify the sensors constituting the first set 24 of sensors from the second set 28 of sensors. However, in practice, these sensors 26 and 30 can be the exact same sensing device. Also, one or both of the rolls 10, 14 may have sensors associated with the roll. For purposes of illustration, however, this discussion will focus on only one of the rolls having sensing and measuring capabilities.

Figure 3A:
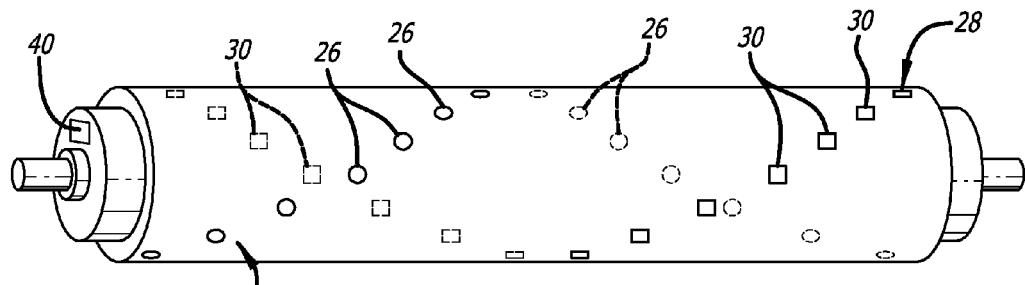
FIG. 3A is a side elevational view of a particular embodiment of a sensing roll made in accordance with the present invention which shows the placement of two sets of sensors along the length of the roll.
Figure 3B:
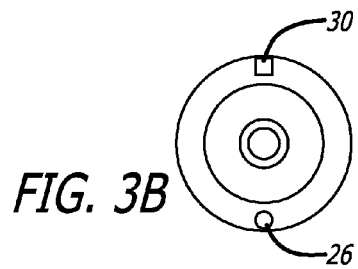
FIG. 3B is an end view of the sensing roll of FIG. 3A showing the placement of the first and second sets of sensors some 180° apart circumferentially on the sensing roll.

These sensors 26 and 30 may be at least partially disposed within the roll cover 22 which forms the portion of the sensing roll 10. Each of the sensors 26 and 30 are adapted to sense and measure a particular data parameter, such as, for example, the pressure that is being exerted on the sensor when it enters the nip region 18. As can be best seen in FIG. 3A, the first set 24 of sensors 26 is shown disposed in a particular configuration along the sensing roll 10, each sensor 26 being located at a particular lateral position (referred to as the "cross-directional position" or "CD position") on the sensing roll 10. Each cross-directional position is a particular distance from the first end 32 of the sensing roll 10. As can be seen in the particular embodiment of FIG. 3A, the first set 24 of sensors 26 are disposed along a line that spirals around the entire length of the sensing roll in a single revolution forming a helix or helical pattern. The second set 28 of sensors 30 is likewise disposed along a line that spirals around the entire length of the sensing roll in a single revolution creating the same helix or helical pattern except that this second set 28 of sensors 30 is separated apart from the first set 24 some 180° circumferentially around the sensing roll 10. FIG. 3B shows an end view of the first set 24 spaced approximately 180° apart from the second set 28. The use of these two lines of sensors 26, 30 allows a large amount of the outer surface of the sensing roll 10 to be measured while the roll 10 is rotating. While the particular pattern of the first set 24 and second set 28 is shown herein in a helical pattern around the roll 10, it should be appreciated that these sets 24, 28 of sensors can be disposed in other particular configurations to provide pressure measurements all along the sensing roll 10.

Each sensor 30 of this second set 28 is disposed at a particular cross-directional position on the sensing roll 10. Each sensor 26 of the first set 24 has a corresponding sensor in the second set 28 with each corresponding sensor of the first and second set being located at the same cross-directional position along the sensing roll. In this manner, each cross-directional position of the sensing roll has a pair of sensors which measure the pressure at two different circumferential positions. Each pair of corresponding sensors are located along the sensing roll 10 at a cross-directional position to provide two sensor readings when the sensing roll completes a full 360° rotation. The average of these two readings can then be utilized to calculate and display the nip pressure profile that is being developed on the rotating nip press 12.

Figure 4:
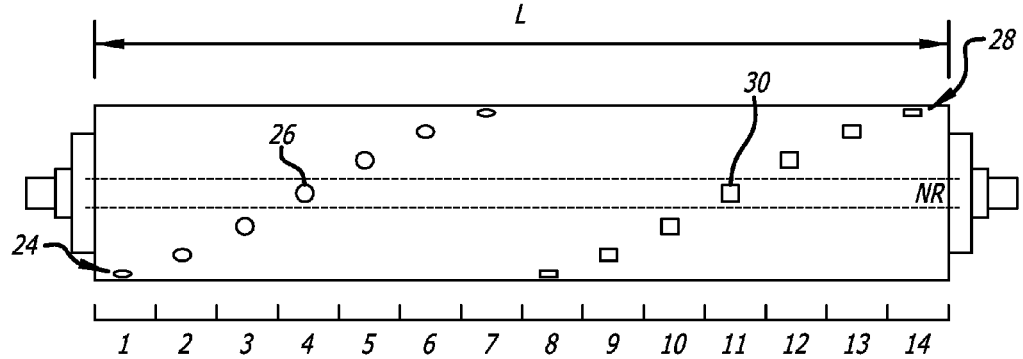
FIG. 4 is a side elevational view showing the placement of the two lines of sensors along the length of the sensing roll with sensors disposed within the nip region which is designated by a pair of dotted lines.
Figure 5:
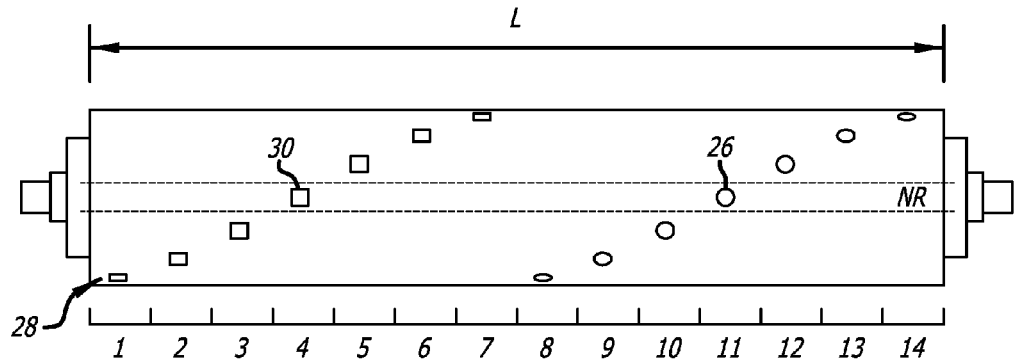
FIG. 5 is a side elevational view showing the placement of the two lines of sensors along the length of the sensing roll after the sensing roll has rotated 180° from its initial position shown in FIG. 4.

The manner in which the pressure measurements can be made is best explained by referring to FIGS. 4 and 5. FIGS. 4 and 5 show side elevational views of the sensing roll 10 as it would be viewed looking directly into the nip region 18 which is depicted by a pair of dotted lines. FIG. 4 shows a typical view in which the sensing roll 10 has a pair of sensors 26, 30 directly in the nip region ready to take a pressure measurement. A grid located at the bottom of the sensing roll 10 for illustrative purposes shows fourteen (14) individual cross-directional positions along the working length L of the sensing roll 10. In FIG. 4, the first set 24 of sensors 26 can be seen depicted positioned at cross-directional positions numbered 1-7. Likewise, the second set 28 of sensors 30 are shown in cross-directional positions numbered 8-14 in FIG. 4. The other sensor 26 of the first set 24 are disposed in cross-directional positions 8-14 but cannot be seen in FIG. 4. Likewise, the remaining sensors 30 of the second set 28 are in positions 1-7 but cannot be seen in FIG. 4 since they are at the reverse side of the sensing roll. It should be appreciated that only fourteen cross-directional positions are shown in these drawings to provide a simple explanation of the manner in which the present invention operates. In actual operation, there can be many more cross-directional positional positions associated with a sensing roll given the long lengths and widths that are associated with these rolls.

Only the sensor 26 located in the $4^{th}$ cross-directional position and the sensor 30 located in the 11th cross-directional position are in proper position for taking the pressure measurement as they are located in the nip region NR. Once these two sensors 26, 30 enter the nip region NR, the pressure being exerted on the sensor is measured. As the sensing roll 10 continues to rotate, the other sensors in the $5^{th}$ and $12^{th}$ cross-directional positions will then be located in the nip region NR and will be able to measure the pressure at these particular positions. Further rotation of the sensing roll 10 places the sensors in the $6^{th}$ and $13^{th}$ cross-directional positions into the nip region NR for pressure measurements. Eventually, the sensing roll 10 rotates 180° from its initial position shown in FIG. 4 and will again have sensors in the $4^{th}$ and $11^{th}$ cross-directional positions. This arrangement of sensors 26, 30 is shown in FIG. 5. The only difference is that a sensor 30 of the second set 28 is now in the $4^{th}$ cross-directional position and a sensor 26 of the first set 24 is in the $11^{th}$ cross-directional position. These sensors 26 and 30 shown in FIGS. 4 and 5 are corresponding sensors which read the pressure at the $4^{th}$ cross-directional position. Likewise, sensor 26 of the first set 24 in FIG. 5 is now in the $11^{th}$ cross-directional position ready to measure the pressure at that location. The sensor 30 in the $11^{th}$ cross-directional position shown in FIG. 4 and the sensor 26 in the $11^{th}$ cross-directional position of FIG. 5 constitute corresponding sensors which provide pressure readings at that particular location on the sensing roll. The system which processes the pressure measurements can take the average of the readings of each pair of corresponding sensors at a particular cross-directional position and calculate the nip profile at that position based on an average reading. For example, if the sensors 26, 30 in the $4^{th}$ cross-directional position both read 200 lbs per linear inch (PLI) then their average would be 200 PLI. This would indicate that there is little, or no, pressure variation caused by the rotation of the sensing roll 10. The average 200 PLI reading would then be used to calculate and display the nip pressure profile at that particular cross-directional position. For example, if the sensor 30 in the $11^{th}$ cross-directional position, as shown in FIG. 4, reads 240 PLI and the sensor 26 in the $11^{th}$ position shown in FIG. 5 reads 160 PLI, then the average pressure would be 200 PLI. These two different readings at the $11^{th}$ cross-directional position would indicate a pressure variation that most likely would be attributed to the high speed rotation of the sensing roll 10. However, in processing the nip pressure profile for the $11^{th}$ cross-directional position, the average pressure measurement of 200 PLI would be utilized since this average will cancel, or nearly cancel, the effect of rotational variability that is occurring along the sensing roll 10. The average of the two measurements will result in a more accurate representation of the pressure being developed at that particular cross-directional position.

In prior art sensing rolls which utilize a single sensor at each cross-directional position, the processing unit would have single sensors at each cross-directional positions. A prior art sensing roll which has a single sensor at the $11^{th}$ cross-directional position in the illustrated example above could only rely on a single reading at that position in order to calculate and display the nip pressure profile. A prior art roll would then use either the 240 PLI or 160 PLI reading for determining and displaying the nip pressure profile at this location. Such a reading would be less than accurate as the sensing roll full rotates in a 360° revolution. Accordingly, the calculated nip pressure at this position will be less than accurate. However, the processing unit would display a nip pressure profile would appear to be accurate but in reality would be less than accurate. If adjustments are made to the sensing roll by the machine operator or through automatic adjustment equipment to compensate for high or low pressure readings, then the sensing roll could be adjusted to develop even more incorrect pressures at various locations in the nip region.

As the roll 10 rotates placing different sensors into the nip region, the respective sensors measure the pressure which is then transmitted to the processing unit. The processing unit associated with each sensing roll 10 can then calculate the average pressure of each pair of corresponding sensors at the various cross-directional positions and produce a nip pressure profile which can be visualized on a monitor or other visual screen. Computer equipment well known in the art could be utilized to process the pressure readings that are being made in milliseconds.

One method of the present invention for sensing and removing the effects of rotational variability from the nip pressure profile of a sensing roll of a nip press thus includes providing a sensing roll having a working length and a plurality of cross-directional positions disposed along the working length and the placement of pairs of pressure-measuring sensors at each cross-directional positions. In the particular embodiment shown in FIGS. 3A-5, the method utilizes sensors being spaced apart 180° circumferentially from each other. This allows for two different pressure measurements to be made at each cross-directional position. The pressure exerted on each sensor of each pair as the sensor moves into the nip region of the nip press can then be measured and the average of each of the two sensors at each cross-directional position can be calculated to determine an average pressure measurement. The average pressure measurements at each cross-directional position can then be used to provide a nip pressure profile for the nip press.

It should be appreciated that while the present invention discloses mathematical modeling that utilizes the direct averaging of the measurements taken by each corresponding sensor, it could be possible to obtain a composite average measurement utilizing other types of models which can obtain and calculate an averaged measurement at each cross-directional position. For example, the operating equipment (data processors) could utilize another model such as "curve fitting" which also can provide the more accurate nip pressure profile. Still other models known in the art could be utilized with the multiple pressure readings from the various sensors to obtain the more accurate nip pressure profile.

Variations of the sensing roll are disclosed in FIGS. 6-8. Referring initially to FIGS. 6A and 6B, three different sets of sensors are utilized and extend around the sensing roll 10. As can be seen in the disclosed embodiment of the sensing roll 10, a first set 24 of sensors 26, a second set 28 of sensors 30 and a third set 32 of sensors 34 are shown as continuous lines of sensors which extend around the sensing roll in one full revolution, each set 24, 28, 32 forming a helix around the sensing roll 10. Sensors 34 are shown as a triangle to distinguish that particular sensor from the sensors 26, 30 of the other two sets 24, 28. Adjacent sets 24, 28 and 30 of sensors are spaced 120° circumferential apart from each other (see FIG. 6B) at a cross-directional position of the sensing roll 10 to provide a good measurement of the actual pressure being developed and would cancel, or at least partially cancel, any rotational variability of 2 times the rotational frequency that might develop at this CD position. Again, the measurements from each of the corresponding sensors at each CD position can be averaged to provide an averaged measurement which provides a more accurate representation of the nip pressure being developed at that CD position.

It should be appreciated that the working length of the sensing roll can be quite long and may require each set of sensors to be wound more than one times around the roll. Again, such a pattern is satisfactory as long as the pattern allows for three sensors to be use at each cross-directional position (spaced 120° apart) in order to produce three separate pressure readings which are then processed to produce a base reading.

Referring now to FIGS. 7A and 7B, a fourth set 36 of sensors 38 has been added to the sensing roll 10 to provide yet another sensor at each CD position. Adjacent sets 24, 28, 30, 36 are spaced 90° circumferential apart from each other (see FIG. 7B) at a cross-directional position of the sensing roll 10 to provide a good measurement of the actual pressure being developed and would cancel, or at least partially cancel, any rotational variability of 2 times the rotational frequency that might develop at this CD position. Again, it should be appreciated that the working length of the sensing roll can be quite long and may require each set of sensors to be wound more than one times around the roll. Such a pattern is satisfactory as long as the pattern allows for four sensors to be use at each cross-directional position (spaced 90° apart) in order to produce four separate pressure readings which are then processed to produce a base reading.

Referring now to FIGS. 8A and 8B, a first set 24 of sensors 26 is shown as a continuous line of sensors which extend around the sensing roll in one half (½) revolution. Likewise, a second set 28 of sensors 30 extend around the sensing roll in one half (½) revolution. In this manner, only a partial helix is formed around the sensing roll 10. This arrangement of sensors 26, 30 still allows a pair of sensors to be assigned to a particular CD position. Like the sensing roll 10 shown in FIGS. 3A-5, adjacent sets 24, 28 are spaced 180° circumferential apart from each other (see FIG. 8B). The resulting structure creates a sensing roll that has only one sensor entering the nip region at any given time. This particular embodiment of the sensing roll 10 should provide a good measurement of the actual pressure being developed and would cancel, or at least partially cancel, any rotational variability of 2 times the rotational frequency that might develop at this CD position.

Figure 9A:
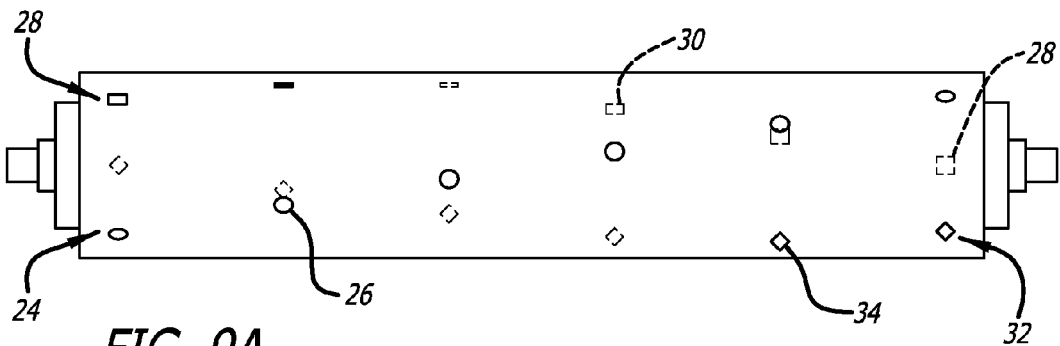
FIG. 9A is a side view of a particular embodiment of a sensing roll made in accordance with the present invention which shows the placement of three sets of sensors wound 120° circumferentially along the length of the roll.
Figure 9B:
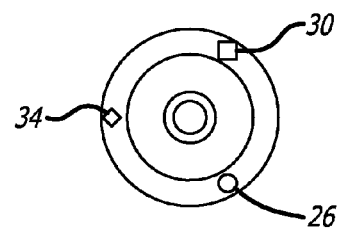
FIG. 9B is an end view of the sensing roll of FIG. 9A showing the placement of the sets of sensors some 120° apart circumferentially on the sensing roll.
Figure 10A:
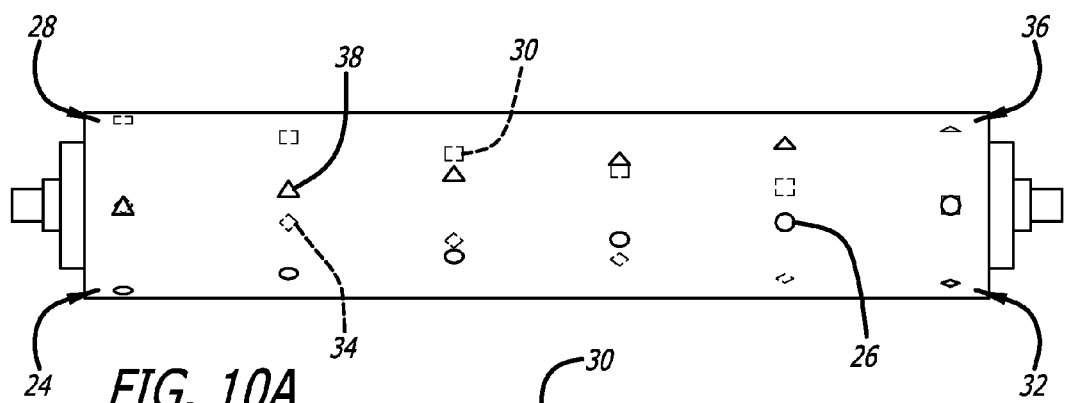
FIG. 10A is a side view of a particular embodiment of a sensing roll made in accordance with the present invention which shows the placement of four sets of sensors wound 90° circumferentially along the length of the roll.
Figure 10B:
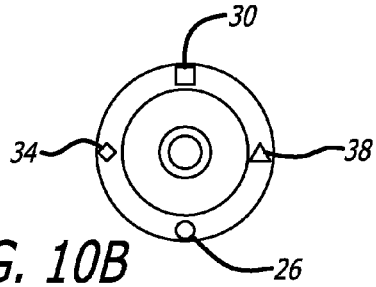
FIG. 10B is an end view of the sensing roll of FIG. 10A showing the placement of the sets of sensors some 90° apart circumferentially on the sensing roll.

In a similar manner three helixes may be wound 120° each, four 90° each or n helixes 360°/n each. The particular advantage of this arrangement of sensors is in sensing short wavelength bars that may be associated with cover wear as each sensing element is at a different rotational position. FIGS. 9A and 9B show three continuous lines 24, 28 and 32 of sensors 26, 30 and 34 which extend around the sensing roll in a partial revolution (a 120° revolution). In this manner, only a partial helix is formed around the sensing roll 10 by each set 24, 28 and 32. This arrangement of sensors 26, 30 and 34 allows group of sensors to be assigned to a particular CD position. Like the sensing roll 10 shown in FIGS. 6A and 6B, adjacent sets 24, 28 and 32 are spaced 120° circumferential apart from each other along the roll (see FIG. 9B). FIGS. 10A and 10B show four continuous lines 24, 28, 32 and 36 of sensors 26, 30, 34 and 38 which extend around the sensing roll in a partial revolution (a 90° revolution). Again, only a partial helix is formed around the sensing roll 10 by each set 24, 28, 32 and 36. This arrangement of sensors 26, 30, 34 and 38 allows group of sensors to be assigned to a particular CD position. Like the sensing roll 10 shown in FIGS. 7A and 7B, adjacent sets 24, 28, 32 and 36 are spaced 90° circumferential apart from each other (see FIG. 10B). The resulting structure creates a sensing roll that has only one sensor entering the nip region at any given time. This particular embodiment of the sensing roll 10 should provide a good measurement of the actual pressure being developed and would cancel, or at least partially cancel, any rotational variability of 2 times the rotational frequency that might develop at this CD position. Similar lines of sensors could be disposed along the length of the sensing roll 10 such that n lines of sensors forming partial helixes are formed and placed 360°/n along the length of the roll 10. Adjacent lines of sensors would be spaced 360°/n circumferentially apart from each other along the roll.

The methods for sensing and removing the effects of rotational variability from the nip pressure profile of a sensing roll of a nip press utilizing the embodiments of FIGS. 6A-10B includes providing a sensing roll having a working length and a plurality of cross-directional positions disposed along the working length and the placement of pairs of pressure-measuring sensors at each cross-directional positions. The method will calculate an average pressure measurement utilizing the number of sensors placed at each CD position. In the embodiments of FIGS. 6A and 6B and FIGS. 9A and 9B, three sensors located a CD position are averaged. Likewise, the readings from the four sensors of the embodiments of FIGS. 7A and 7B and FIGS. 10A and 10B are utilized to produce an average pressure measurement. The embodiment of FIGS. 8A and 8B, like the embodiment of FIGS. 3A-5, utilize a pair of sensor measurements at each CD position. The average pressure measurements at each cross-directional position can then be used to provide a nip pressure profile for the nip press.

The sensors used in the various sets can be electrically connected to a transmitter unit 40 which also can be attached to the sensing unit 10. The transmitter unit 40 can transmit wireless signals which can be received by a wireless receiver located at a remote location. The wireless receiver can be a part of a system which processes the signals, creates the nip profile and sends corrective signals back to the sensing roll 10. Sensors may be collected in the same collection period and average together for immediate use. However, the additional wireless transmission may reduce the battery life of the wireless unit. As the rotational variability changes slowly, alternating the collection between the sensors and averaging together the collections in the alternate collection periods will provide comparable information and may save battery life.

Figure 11:
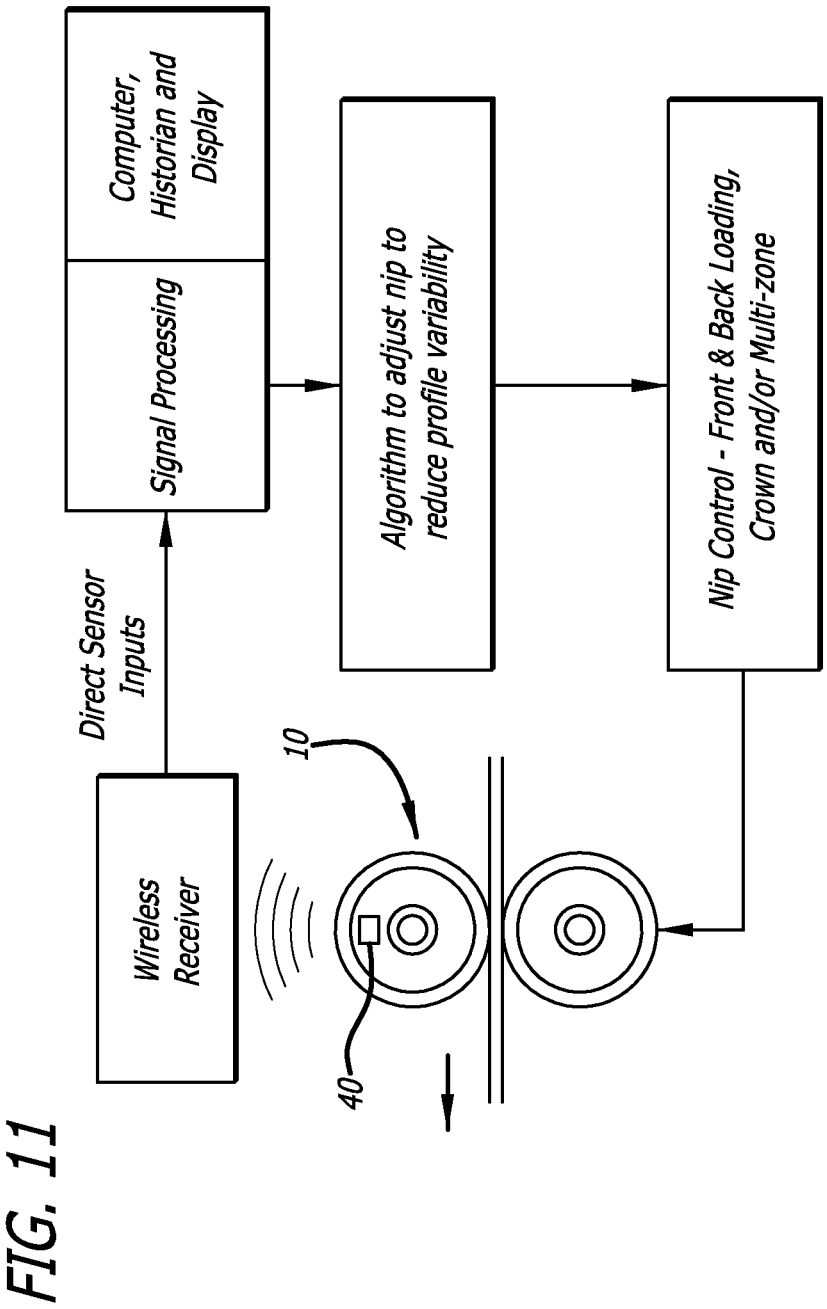
FIG. 11 is a schematic drawing showing the basic architecture of a particular monitoring system and paper processing line which could implement the sensing roll of the present invention.

One particular system for processing the signals is shown in FIG. 11 and will be discussed in greater detail below. Wireless transmission can be carried out via radio waves, optical waves, or other known remote transmission methods. If a direct wired transmission is desired, slip ring assemblies and other well-known electrical coupling devices (not shown) could be utilized.

FIG. 11 illustrates the overall architecture of one particular system for monitoring of a product quality variable as applied to paper production. The system shown in FIG. 11 includes processing equipment which calculates and displays the nip pressure profile. For example, the pressure measurements can be sent to the wireless received from the transmitter(s) located on the sensing roll. The signals are then sent to the high resolution signal processor to allow the average pressure measurements to be calculated and utilized to create and display the nip pressure profile. Data can be transferred to the process control which can, for example, send signals back to the sensing roll to correct pressure distribution across the nip region. One such nip press which is capable of real time correction is described in U.S. Pat. No. 4,509,237, incorporated herein by reference in its entirety. This nip press utilizes a roll that has position sensors to determine an uneven disposition of the roll shell. The signals from the sensors activate support or pressure elements underneath the roll shell, to equalize any uneven positioning that may exist due to pressure variations. Other known equipment which can correct the roll cover could also be used.

The sensors can take any form recognized by those skilled in the art as being suitable for detecting and measuring pressure. Pressure sensors may include piezoelectric sensors, piezoresistive sensors, force sensitive resistors (FSRs), fiber optic sensors, strain gage based load cells, and capacitive sensors. The invention is not to be limited to the above-named sensors and may include other pressure sensors known to those of ordinary skill in the art. It should be appreciated that data relating to the operational parameter of interest, other than pressure, could be utilized with the present invention. In this case, the sensors could be used to measure temperature, strain, moisture, nip width, etc. The sensors would be strategically located along the sensing roll as described above. Depending on the type of sensor, additional electronics may be required at each sensor location. The design and operation of the above sensors are well known in the art and need not be discussed further herein.

The processor unit is typically a personal computer or similar data exchange device, such as the distributive control system of a paper mill that can process signals from the sensors into useful, easily understood information from a remote location. Suitable exemplary processing units are discussed in U.S. Pat. Nos. 5,562,027 and 6,568,285 to Moore, the disclosures of which are hereby incorporated herein in their entireties.

Figure 12:
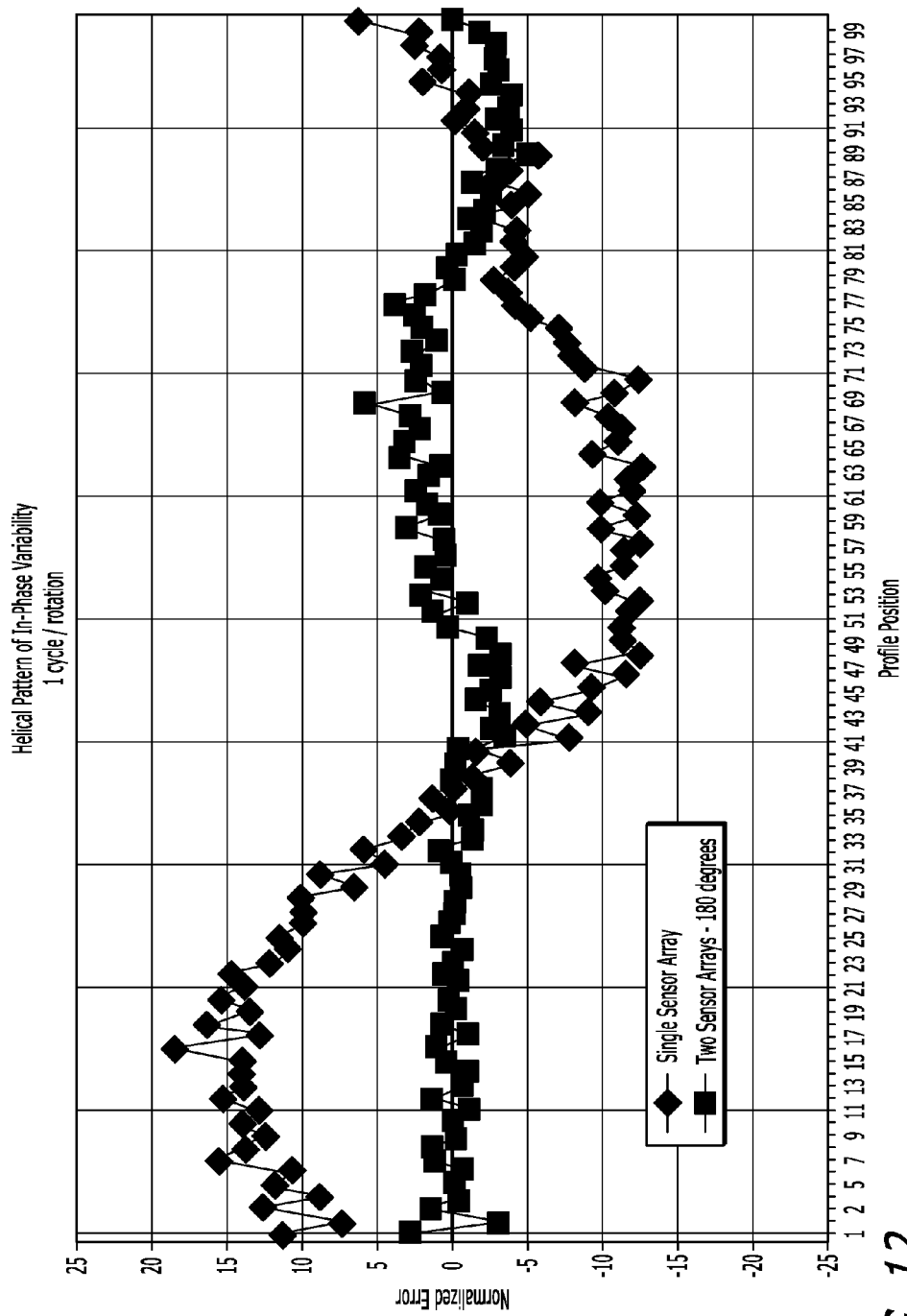
FIG. 12 is a graphical display showing a plot of normalized error versus profile position for a single sensor array and two sensor array showing a helical pattern of in-phase variability over one cycle.
Figure 13:
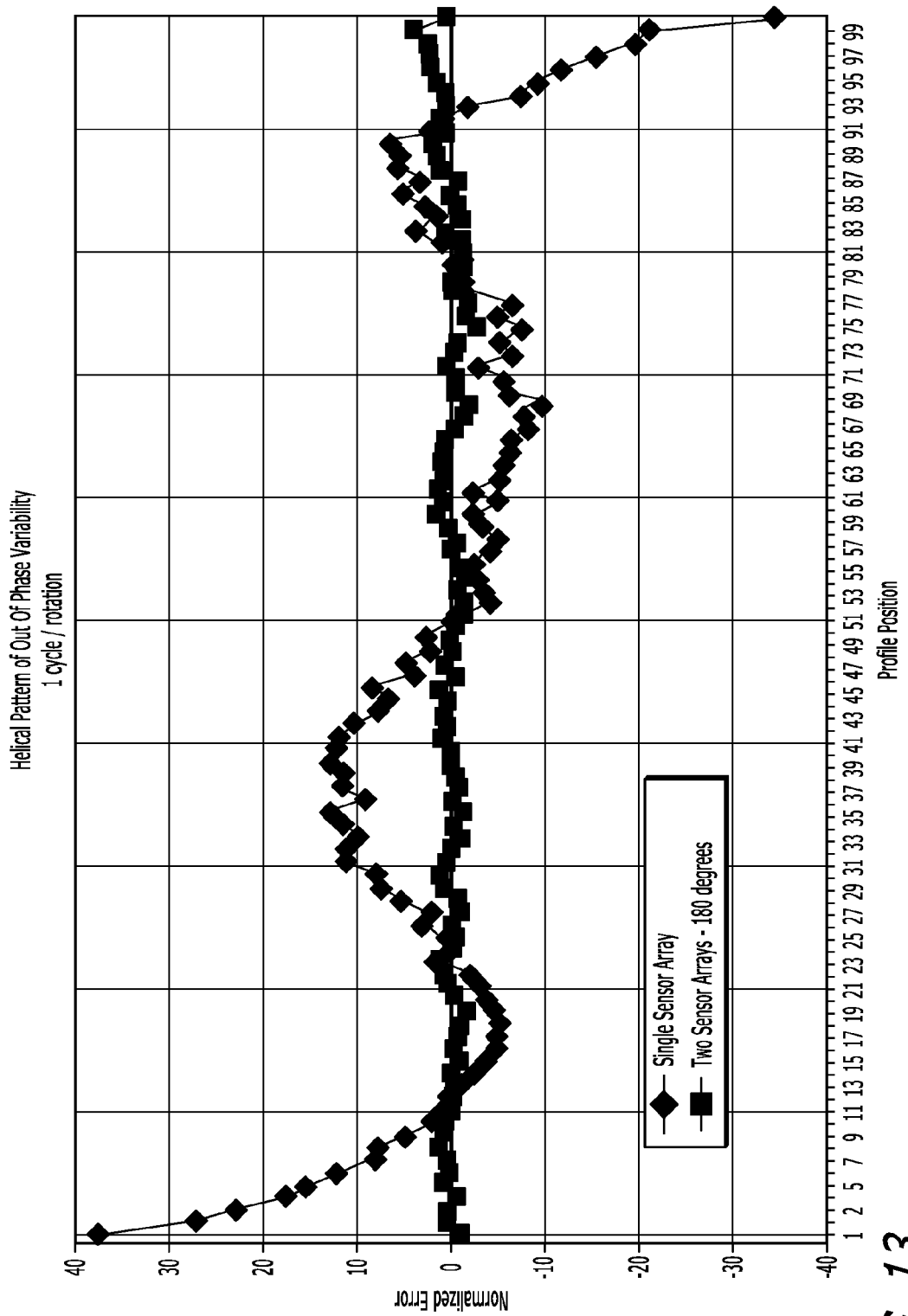
FIG. 13 is a graphical display showing a plot of normalized error versus profile position for a single sensor array and two sensor array (180°) showing a helical pattern of out of phase variability over one cycle.
Figure 14:
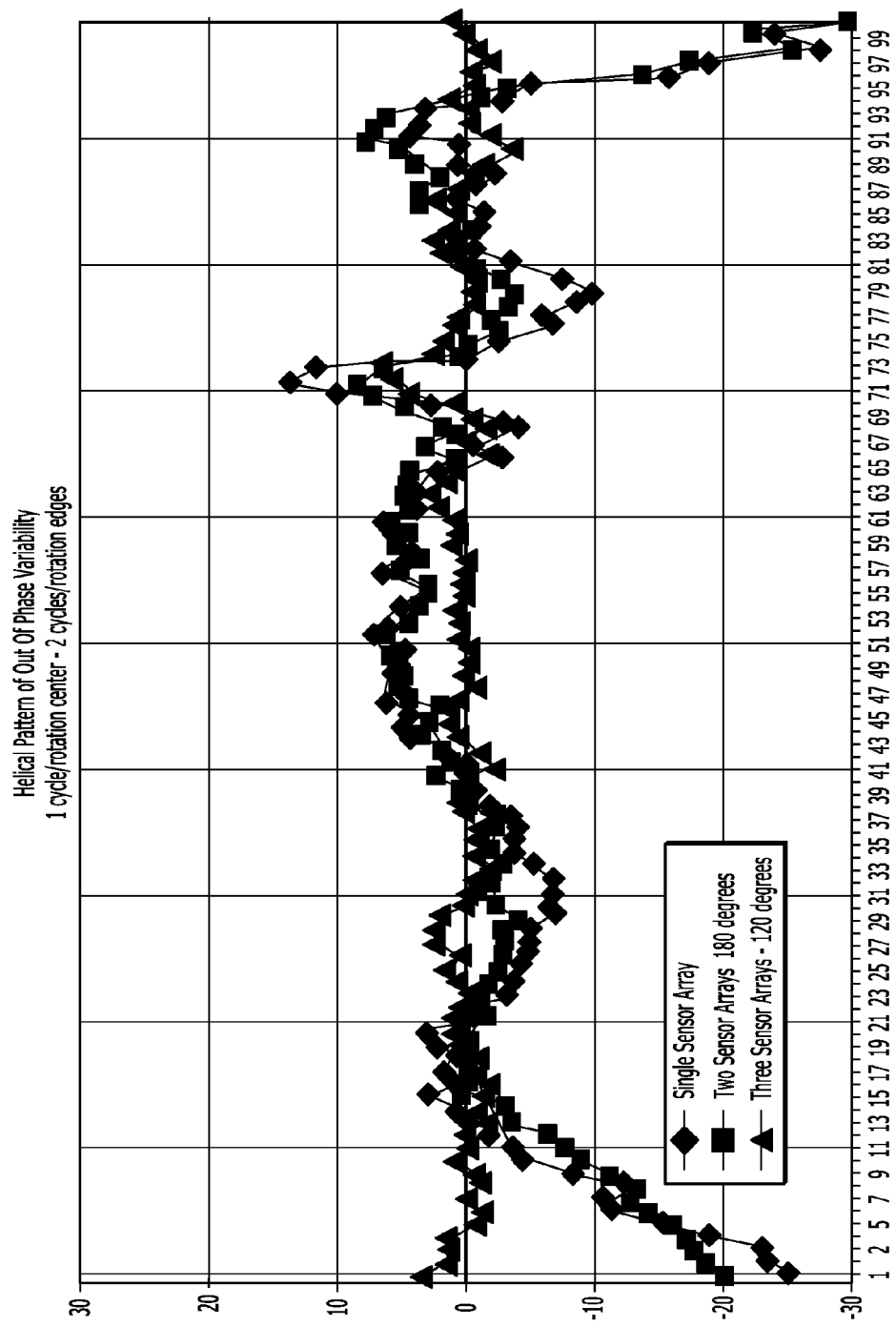
FIG. 14 is a graphical display showing a plot of normalized error versus profile position for a single sensor array, a two sensor array (180°) and three sensor array (120°) showing a helical pattern of out of phase variability over one cycle/rotation center and 2 cycles/rotation edges.

Referring now to FIGS. 12-15, graphical displays are provided which further explains and presents typical mapping of roll variability which can develop during operation. Roll surfaces were mapped pursuant to the methods and apparatus described in U.S. Pat. No. 5,960,374 using paper properties sensors that were related to nip pressure. The mappings used an array of 5,000 elements broken into 100 CD positions and 50 rotational positions. The mappings confirmed that most roll variability occurs in 1 cycle per revolution in-phase across the roll or out-of-phase (the phase shifts with profile position). A 2 cycle per revolution pattern is sometime noted at the edges of the roll. Higher frequencies (such as 3 cycles per revolution) are rarely seen and then only at the extreme edges and have little impact. Three roll surface maps were normalized (scaled on 0-100%) and helical scan paths were superimposed over the surface maps. The true nip pressure profile was determined by averaging the 50 rotational positions at each of the 100 CD positions. The helical scan paths and the averages of two or more of these paths at various separation angles were used to develop estimates of the nip pressure profile. These estimates were then subtracted from the true nip profile to obtain the error in each estimate. FIGS. 12 and 13 demonstrate that two sensor arrays across the width of the roll and separated by 180° circumferentially are sufficient to remove most of the rotational variability when the variability is 1 cycle per revolution. FIG. 14 demonstrates that 2 arrays are not sufficient to handle the 2 cycle per revolution variability at the edges as the estimate difference from the true nip profile is an large at the edges as the single helical scan. For this case a minimum of 3 arrays separated by 120° would be needed. A larger number of arrays per revolution may further reduce the measurement error, but at a higher cost. Therefore, the embodiment of three (3) arrays (lines) of sensors separated by 120° circumferentially insures that all 1 cycle/revolution and 2 cycle/revolution variability is reduced. However, 2 arrays may be sufficient for many rolls without 2 cycle/revolution variability and more than 3 arrays may give superior variability measurement and reduction but at a higher cost.

Figure 15:
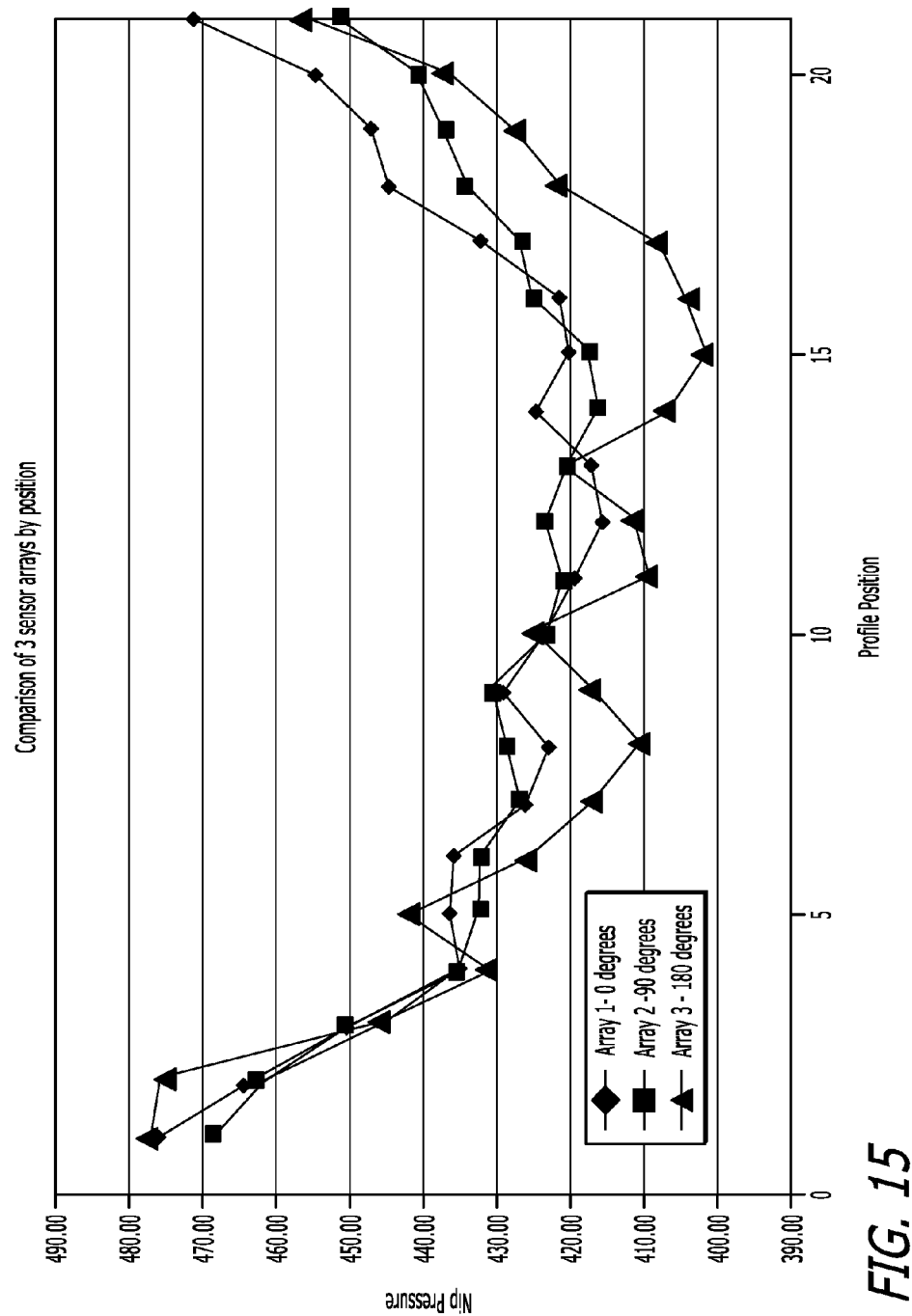
FIG. 15 is a graphical display showing a comparison of nip pressure versus profile position for 3 sensor arrays for array 1 (0°), array 2 (90°) and array 3 (180°).

FIG. 15 shows nip pressure profiles collected on a roll using the various embedded sensors. The data show clear differences in the profile between the 3 arrays. Most notably, arrays 1 & 3 (separated by 180°) show a significant difference in shape, especially in profile position 14-20.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Thus, any modification of the shape, configuration and composition of the elements comprising the invention is within the scope of the present invention. Accordingly, what is desired to be secured by Letters Patent of the United States is the invention as defined and differentiated in the following claims.

What is claimed:
1. A sensing roll for use in a nip press, comprising:
a substantially cylindrical member having an outer surface and adapted for rotational movement;
a roll cover circumferentially overlying the outer surface of the cylindrical member; and
a sensing system associated with the roll cover, comprising:
a first set of pressure-measuring sensors disposed in a particular configuration along the roll cover, each sensor of the first set being located at a particular cross-directional position on the roll cover; and at least one additional set of pressure-measuring sensors disposed in a particular configuration along the roll cover, each sensor of the at least one additional second set being located at a particular cross-directional position on the roll cover, wherein each sensor of the first set has a corresponding sensor in each of the at least one additional set of pressure-measuring sensors which is located at the same cross-directional position and spaced apart circumferentially in an evenly spaced manner, and wherein the first set and the at least one additional set of pressure-measuring sensors comprises n sets of sensors, wherein each sensor of a one of the n sets has a corresponding sensor in the remaining n−1 sets, each corresponding sensor being located at the same cross sectional position and spaced 360°/n apart circumferentially from an adjacent sensor, each set of sensors forming a partial helix which extends about 360°/n around the sensing roll.

2. The sensing roll of claim 1, comprising:
a transceiver attached to the cylindrical member and each of the sensors of the first set and the at least one additional set of pressure-measuring sensors for transmitting data signals from the sensors.

3. The sensing roll of claim 1, wherein the pressure being applied to a sensor from the first set and the at least one additional set of pressure-measuring sensors is measured when these sensors enter the nip region of the nip press.

4. The sensing roll of claim 1, wherein the at least one additional set of pressure-measuring sensors includes a second set and a third set, wherein each sensor of the first set has a corresponding sensor in the second and third sets which is located at the same cross sectional position and spaced 120° apart circumferentially.

5. The sensing roll of claim 1, wherein the at least one additional set of pressure-measuring sensors includes a second set, wherein each sensor of the first set has a corresponding sensor in the second set which is located at the same cross sectional position and spaced 180° apart circumferentially.

6. The sensing roll of claim 1, wherein the at least one additional set of pressure-measuring sensors includes a second set, a third set and a fourth set, wherein each sensor of the first set has a corresponding sensor in the second, third and fourth sets, each corresponding sensor being located at the same cross sectional position and spaced 90° apart circumferentially from an adjacent sensor.

7. The sensing roll of claim 1, wherein the at least one additional set of pressure-measuring sensors includes a second set and a third set, wherein each sensor of the first set has a corresponding sensor in the second and third sets which is located at the same cross sectional position and spaced 120° apart circumferentially from an adjacent sensor, each set of sensors forming a partial helix which extends about 120° around the sensing roll.

8. The sensing roll of claim 1, wherein the at least one additional set of pressure-measuring sensors includes a second set, wherein each sensor of the first set has a corresponding sensor in the second set which is located at the same cross sectional position and spaced 180° apart circumferentially, each set of sensors forming a partial helix which extends about 180° around the sensing roll.

9. The sensing roll of claim 1, wherein the at least one additional set of pressure-measuring sensors includes a second set, a third set and a fourth set, wherein each sensor of the first set has a corresponding sensor in the second, third and fourth sets, each corresponding sensor being located at the same cross sectional position and spaced 90° apart circumferentially from an adjacent sensor, each set of sensors forming a partial helix which extends about 90° around the sensing roll.

10. A system for calculating and displaying a nip pressure profile for a nip press, comprising:
a sensing roll configured with a second roll in a nip press, the sensing roll and the second roll adapted to rotatingly press matter therebetween in a nip region,
the sensing roll comprising a plurality of cross-directional positions along its length,
the sensing roll comprising a plurality of sets of pressure-measuring sensors,
each sensor of the plurality of sets of sensors being disposed at a cross-directional position along the sensing roll,
each sensor configured to sense and measure pressure when the sensor enters the nip region of the nip press,
wherein the plurality of sets of pressure-measuring sensors comprises n sets of sensors, wherein each sensor of a one of the n sets has a corresponding sensor in each of the remaining n−1 sets, each corresponding sensor being located at the same cross-directional position and spaced 360°/n apart circumferentially from an adjacent sensor on the sensing roll, each set of sensors forming a partial helix which extends about 360°/n around the sensing roll,
each of the corresponding sensors of the plurality of sets providing a measurement of pressure at the respective cross-directional position which is averaged to supply an average measurement to processing equipment which calculates and displays a nip pressure profile for the nip press.

11. The system of claim 10 wherein a mathematical model is used to analyze the plurality of sensor readings at each cross-directional position to correct the nip pressure and calculate a nip rotational variability profile.

12. The system of claim 10, further comprising a transceiver attached to the sensing roll and to each of the sensors of the plurality of sets for transmitting data signals from the sensors to a receiver unit.

13. The system of claim 12, further comprising a processing unit for calculating the nip pressure distribution based on the average of the pressure measurements of each plurality of corresponding sensors of the plurality of sets of pressure-measuring sensors and displaying the nip pressure profile and a nip variability profile on a display unit.

14. The system of claim 10, wherein the sensors of the each set are disposed in a certain pattern along the sensing roll.

15. A method for determining a nip pressure profile of a sensing roll of a nip press, comprising:
measuring a pressure exerted on a first sensor disposed at a particular cross-directional position on the sensing roll as the first sensor enters a nip region of the nip press;
measuring a respective pressure exerted on one or more additional sensors at the particular cross-directional position as they enter the nip region of the nip press,
each of the one or more additional sensors being located at the particular cross-directional position as the first sensor and spaced apart circumferentially from the first sensor; and
averaging the pressure measurement of the first sensor and the pressure measurement of the one or more additional sensors and determining a nip pressure profile, wherein the first sensor, the one or more additional sensors and a plurality of further sensors, the further sensors being located at one or more other cross-directional positions along the sensing roll, comprise a plurality of sensors arranged as n sets of sensors, wherein each sensor of a one of the n sets has a corresponding sensor in the remaining n−1 sets, each corresponding sensor being located at a same cross sectional position and spaced 360°/n apart circumferentially from an adjacent sensor, each set of sensors forming a partial helix which extends about 360°/n around the sensing roll.

16. The method of claim 15, further comprising:
displaying the nip pressure profile based on the average pressure measurements of the first sensor and the one or more additional sensors.

17. The method of claim 15, further comprising:
adjusting the sensing roll to reduce a variability of the nip pressure profile at the particular cross-directional position on the sensing roll.

18. A method for determining a nip pressure profile of a sensing roll of a nip press, comprising:
placing n sets of sensors on the sensing roll, wherein n is an integer greater than one,
each sensor of the n sets of sensors being disposed around the sensing roll for sensing pressure exhibited on the sensing roll at that sensor's location and for providing a pressure signal representative thereof,
each of the sensors of the n sets being disposed at a particular cross-directional position out of a plurality of cross-directional positions along the sensing roll,
each sensor of a one of the n sets having a corresponding sensor in the remaining n−1 sets, each corresponding sensor being located at the same cross-directional position and spaced 360°/n apart circumferentially from an adjacent sensor on the sensing roll, each set of sensors forming a partial helix which extends about 360°/n around the sensing roll;
measuring the pressure exerted on each sensor of the n sets when the sensing roll is rotating and the sensors are in the nip region of the nip press; and
at each of the plurality of cross-directional positions, averaging the pressure readings of each sensor of the n sets located at that cross-directional position.

19. The method of claim 18, wherein the sensors of the n sets are disposed along the sensing roll such that a sensor of one set is in the nip region of the nip press when a sensor of at least one other set is also in the nip region of the nip press.

20. The method of claim 18, wherein a respective pressure measurement is made by each sensor of each of the n sets as the sensors enter the nip region.

21. The method of claim 18, wherein the measurements of the sensors are transmitted wirelessly by a device attached to the sensing roll.

22. The method of claim 18, wherein each sensor of a particular one of the n sets is located at a different cross-directional position from another sensor of the particular one set.

23. The method of claim 18, further comprising:
adjusting the sensing roll to reduce the variability of the nip pressure profile.

24. The method of claim 18, wherein: a first set of sensors is disposed along the sensing roll in a particular pattern and all other sets of the n sets of sensors are disposed in the same pattern.

25. A method for providing a nip pressure profile of a sensing roll of a nip press, comprising:
providing a sensing roll having a working length and a plurality of cross-directional positions disposed along the working length;
placing multiple pressure-measuring sensors at each cross-directional position,
the sensors at each cross directional position being spaced apart circumferentially from the other;
measuring the pressure exerted on each sensor at each cross-directional location as the sensor moves into the nip region of the nip press;
at each cross-directional position, averaging the pressure measurements from all sensors at that cross-directional position to determine an average pressure measurement at each cross-directional position; and
utilizing the average pressure measurements from each cross-directional position to provide a nip pressure profile for the nip press,
wherein the multiple pressure-measuring sensors at each cross-directional position are arranged as n sets of sensors, wherein each sensor of a one of the n sets has a corresponding sensor in the remaining n−1 sets, each corresponding sensor being located at a same cross sectional position and spaced 360°/n apart circumferentially from an adjacent sensor, each set of sensors forming a partial helix which extends about 360°/n around the sensing roll.

* * * * *